Figure 1:
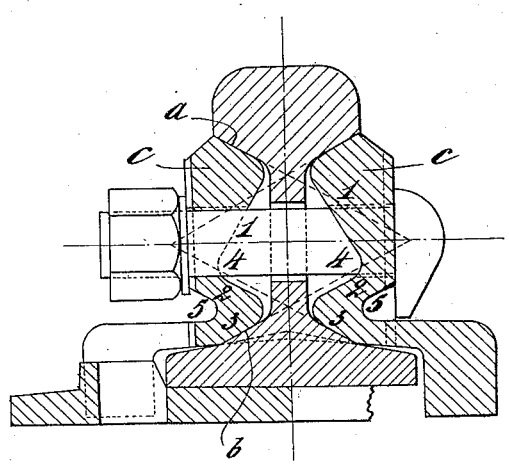

No. 845,564. PATENTED FEB. 26, 1907.
G. P. A. L. MENARD.
FISH PLATE FOR THE RAIL JOINTS OF RAILWAYS AND THE LIKE.
APPLICATION FILED SEPT. 26, 1906.

Witnesses:
O. A. Foster
A. L. O'Brien

Inventor
Georges Pierre Auguste Louis Menard
by
Dickerson, Brown,
Raegener & Binney attys

UNITED STATES PATENT OFFICE.

GEORGES PIERRE AUGUSTE LOUIS MENARD, OF LA LOUVIÈRE, BELGIUM.

FISH-PLATE FOR THE RAIL-JOINTS OF RAILWAYS AND THE LIKE.

No. 845,564. Specification of Letters Patent. Patented Feb. 26, 1907.

Application filed September 26, 1906. Serial No. 336,270.

*To all whom it may concern:*

Be it known that I, GEORGES PIERRE AUGUSTE LOUIS MENARD, a subject of the King of the Belgians, and residing at La Louvière, Belgium, have invented new and useful Improvements in Fish-Plates for the Rail-Joints of Railways and the Like, of which the following is a specification.

The present invention relates to improvements in fish-plates for the joints of rails of railways and the like.

The invention has for its object to enable the plates to be thoroughly screwed up, to increase the pressure exerted by the plates, and to avoid the loosening of the plates. It is known that the fish-plate forms a wedge intended to engage on the tightening of the bolts between the fish-plate-abutting surfaces of the rail; but as the rails are formed by rolling, the faces of the said abutting surfaces offer marked irregularities and rough parts which produce on the clamping of the plates a considerable amount of friction, preventing the fish-plate from closing thoroughly up to its work—that is to say, from occupying between the two abutting surfaces the geometrical position which it ought to take and would take if the surfaces in contact were absolutely close, polished, and lubricated. There consequently remains a slight play between the fish-plate and the rails, which increases with time and produces the loosening of the plate, as well as the loosening of the bolts. It has been thought that it was sufficient in order to prevent the danger of the loosening of the plates and bolts to simply increase the pressure, and attempts have been made to arrive at this result by imparting to the fish-plates a bulged form, so as to make a spring, but on tightening the bolts (this being exerted, essentially, in the central axis of the plate) the two branches of the plate come into contact at the same time with the opposing surfaces of contact and form struts simultaneously, so that the plate acts as a spring from the commencement of the tightening up and cannot be clamped right up. Furthermore, with this arrangement the radii of oscillation of the parts of the plate are so small that these parts and in particular the parts corresponding to the abutting surface of the head of the rail do not slide tangentially with respect to this surface. There always remains, therefore, a small play or separation, especially at the head of the plate, which favors the dropping of the end of the rail and leads in time to a slackening of the clamping arrangement. Now experiments have shown that complete clamping of the fish-plate and the entire suppression of any play with a maximum of pressure may be obtained if the plate is allowed to be first tightened up, as usual, until it is stopped by the friction of the surfaces to then put it out of shape and to correct or adjust by an independent advancement of its parts all play existing between the edges of the plate and the clamping-surfaces. This particular clamping effect is obtained in a sure manner by giving the plate a longitudinal fold, with the result of producing clamping branches able to oscillate independently one from the other and acting as a spring. These branches are preferably of unequal lengths, so as to obtain for the upper branch the maximum length possible of oscillating radius. This arrangement is best realized by making the fold in such manner as to give to the plate a zigzag shape, which to increase the possibility of the variation in form of the plate is preferably combined with a reduction of the thickness of the plate toward the external apex of the zigzag. This apex constitutes the axis of oscillation of the branches of the fish-plate. The reduction of the section is of course not carried so far as to interfere with the necessary strength of the plate.

The accompanying drawing shows a fish-plate constructed according to this invention.

Figure 2:
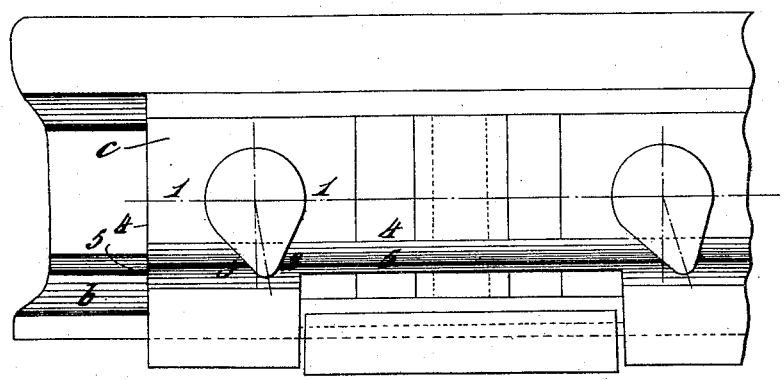

Figure 1 is a transverse section, and Fig. 2 is a front view, of a rail-joint provided with the present system of fish-plate.

*a* and *b* are the clamping-surfaces. *c* is the fish-plate forming the variable-shape wedge adjusting itself between these surfaces. Besides the ordinary fold 5, here shown turned sharply inward, the plate is given a reverse fold at 4, so as to present a zigzag shape 1 2 3, Fig. 1. The section of the branch 1 is greatly reduced toward the position of the fold 4, as well as the thickness of the shorter branch 2 3 being reduced toward the part 4. These two branches 1, 2, and 3 thus form a spring and can oscillate within a certain limit about the axis 4. The radius of oscillation of the upper branch 1 is considerably longer than that of the lower branch 2 3.

On the external face the part 1 of the plate is preferably provided with a flat surface intended to form a good seating for the heads of the bolts and for the nuts and to permit a uniform action of the two opposite sides of the joint. When being fixed, the plate acts at first, under the clamping effect of the bolts, like an ordinary fish-plate and takes between the clamping-surfaces of the rail the position which the friction between the surfaces in contact allows it to assume; but if the bolts are screwed up tighter the plate alters in shape. The two branches of the zigzag slide forward independently one of the other, and it thus opens in such a manner as to do away with the play which remained between the clamping-surfaces and the plate and to increase considerably the supporting-pressure. The short branch 2 3 first slides quite home, the branch 1 then goes right in, and the tightening being continued the two branches separate until the maximum of separation is obtained, determined by the distance apart of the clamping-surface.

Having now described my invention, I declare that what I claim, and desire to secure by Letters Patent, is—

1. A deformable fish-plate for rail-joints having a longitudinal fold, an inset longitudinal part and a reduction of section increasing toward the apex of the fold, constructed in such a manner as to have a zigzag shape between the clamping-surfaces (head and flanges) of the rail constituting non-symmetrical clamping branches and forming a spring capable after the resistance resulting from the friction of the surfaces in contact, of opening out one from the other by sliding forward and independently one of the other, substantially as described.

2. A fish-plate for rail-joints having a longitudinal fold and a reverse fold forming branches which operate as a spring and are adapted to oscillate about the reverse fold, the radius of oscillation of one branch being longer than that of the other branch.

3. A fish-plate for rail-joints having a longitudinal fold and a reverse fold forming branches, the sections of which are reduced toward the reverse fold, said branches being adapted to operate as a spring and to oscillate about the reverse fold independent of each other.

In testimony whereof I have signed my name to this specification in the presence of two subscribing witnesses.

GEORGES PIERRE AUGUSTE LOUIS MENARD.

Witnesses:
A. GRAETZ,
GREGORY PHELAN